Patented May 20, 1930

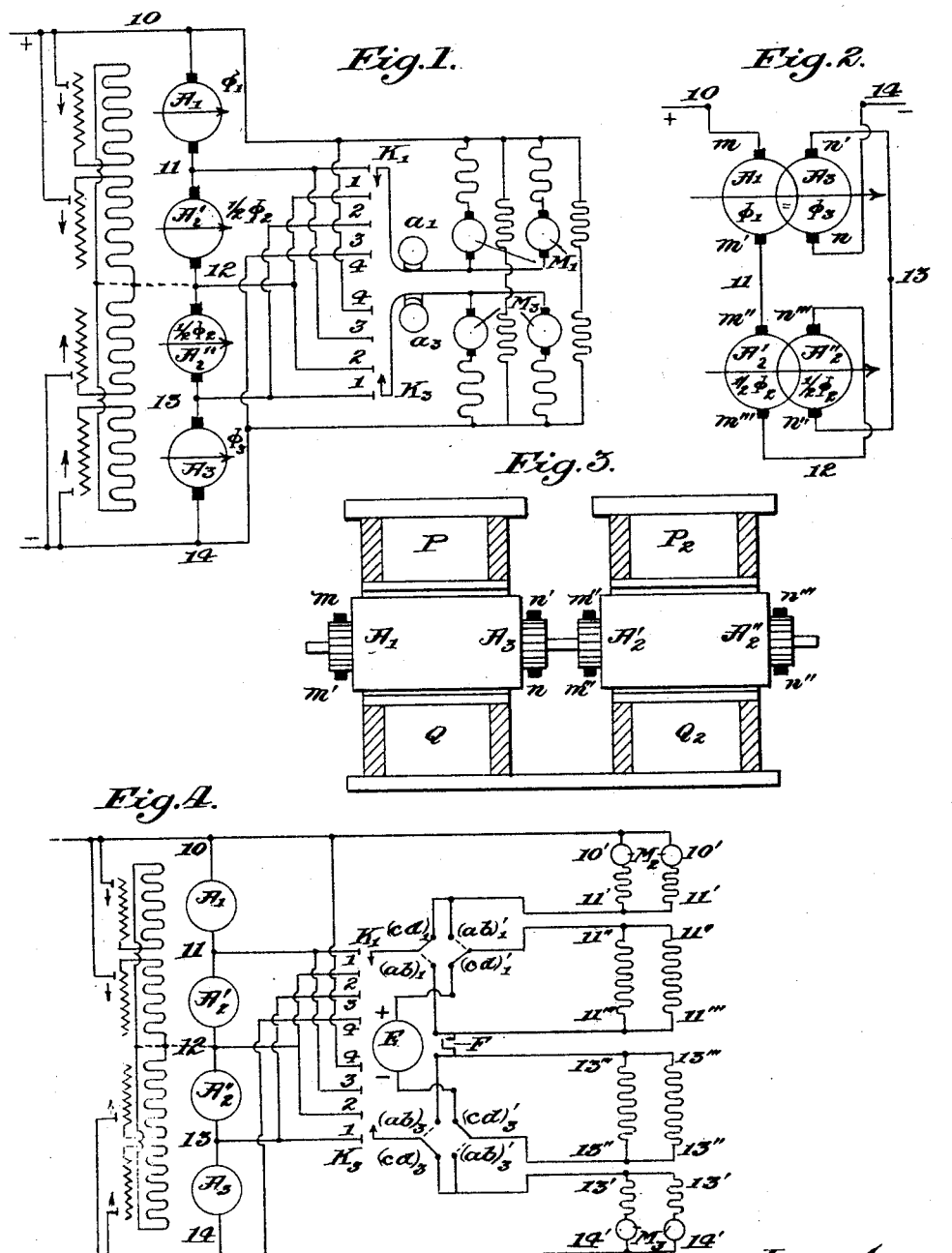

1,759,759

UNITED STATES PATENT OFFICE

ANGELO DELLA RICCIA, OF BRUSSELS, BELGIUM

DIRECT-CURRENT PRESSURE-SPLITTING DEVICE

Application filed December 2, 1921, Serial No. 519,558, and in France December 16, 1920.

This invention relates to a system of supply of electric current from a power circuit to electric interconnected translating devices, such as motors, used for traction, hoisting, rolling mills and the like; or to storage batteries; from a continuous current main line service at constant pressure, without loss of energy in resistance or in braking, and with regeneration during braking or descent.

An object of the invention is to provide a system or arrangement wherein the main line pressure is divided into a plurality of continuously variable fractions, sundry of which are equal one to the other, and is supplied to mechanisms for utilizing the current, such as storage batteries, motors or groups of motors, in a gradually increasing or decreasing pressure. A further object of the invention is to allow the electric energy to proceed as much as possible directly from the main line to the said apparatus or inversely, so as to diminish, as far as possible, the use of the elements of the regulating machine or arrangement (armatures or their parts) and to thus reduce the size and weight of the said elements, as well as losses in the same; a further object of the invention is to cause the regulating machine or arrangement to fulfill various secondary functions of a useful nature, such as the control at suitable speed of exciters, or other auxiliary apparatus, which may be necessary to carry the invention properly into effect.

When it is desired to supply operation motors with pressure varying between O and V, a transformer of the motor-generator type may be used, having two motor armatures and generator armatures in series at the voltage V, the generator armature supplying a voltage $e$ varying from O to V, and the motor armatures working at a pressure $e_2$, varying from V to O, $e_1$ plus $e_2$ being equal to V.

In the present invention a part of the energy is enabled to pass directly from the main distribution line into the operation motors, means being provided whereby each motor or group of motors may be first connected with the supply line in shunt with a selected armature or armature part of the transformer, as for instance an end armature, and whereby the intermediate armatures may afterwards be interposed in both shunts.

In the drawings forming a part hereof:

Fig. 1 shows the general arrangement of a converter or pressure splitting device with four armature parts or sections, the connections being modified at will by symmetrical switches $K_1$, $K_3$.

Fig. 2 is a diagram of the armatures and their connections.

Fig. 3 shows the structural arrangement of the field magnets and armatures of the machines.

Fig. 4 shows the general arrangement of a plant comprising in combination an exciter driven by the shaft of the device and serving to control the working motors.

In the arrangement shown in Fig. 1, the motor groups $M_1$, $M_3$, are in shunt with the supply line 10, 14, each group in a separate shunt, and with the members of the groups in parallel. The transformer, of the motor-generator type, has its armature divided into four parts, two end parts $A_1$, $A_3$, and two intermediate parts $A'_2$, $A''_2$, which for convenience may be joined to form a single part, hereafter referred to as the part $A_2$. These armatures or armature parts are connected in series, and the transformer is in shunt with the line.

The field windings of the transformer are shown at the left of armatures $A_1$, $A'_2$, $A''_2$ and $A_3$, Fig. 1 and are controlled by the variable resistances shown therein. By means of these resistances the flux produced by the end field windings, Fig. 1, may be increased or decreased and at the same time that of the intermediate windings decreased or increased respectively.

Between the armatures or armature parts, the shunt line in which they are arranged, is tapped, as indicated at 11, 12, and 13, and connected to the contacts of a double switch, composed of two symmetrically arranged parts $K_1$, $K_3$, the contacts being indicated at 1, 2, 3, 4, 4, 3, 2, 1, respectively. Shunt leads from the line 10, 14, are connected with the contacts 4, 4, of the switch, the contacts 2, 2, are directly connected to the point 12, and the contacts 1, 3, 3, 1, are connected to 11 and 13 respectively. The upper part of the switch controls the current to motors $M_1$, and the lower part that to motor $M_3$.

Assuming that the two groups of motors are of a similar nature, that is $e_1$ equals $e_3$, this being obtained by regulation of the fluxes so that $\phi$ equals $\phi_3$, and $\phi'_2$ equals $\phi''_2$, letting $i$ represent the current in each group of motors, and premising that the currents in the armature parts $A_1$ and $A_3$, indicated by $i_1, i_3$, are equal, and that the currents $i'_2, i''_2$, in the parts $A'_2, A''_2$, are also equal, the operation of this system or arrangement will be as follows.

The operation may for convenience of description be divided into four periods; two of starting, and two of braking, which will be hereafter referred to as periods $a$, $b$, $c$, and $d$.

(a) First period of starting.

The motors $M_1$ $M_3$ are switched into the circuit by placing switches $K_1$ and $K_3$ upon studs of the contacts 1, thus connecting the motors in shunt with the end armatures $A_1$ and $A_3$ at 10 and 11, and 13 and 14 respectively. The fluxes $\phi_1=\phi_3$ are increased or the fluxes $\phi'_2=\phi''_2$ decreased so as to supply to the motors $M_1$ $M_3$ the two E. M. F.'s $e_1=e_3$ which are always greater than their proper counter-E. M. F.

The main line supplies to the motors $M_1$ $M_3$ and the transforming device a current which (neglecting the currents $i_0$ representing transformer losses) is equal to the difference between currents $i_1$ and $i'_2$, and power which increases from O to $Vi$, each motor or group of motors $M_1$ $M_3$ absorbing power which is increased from O to $\frac{Vi}{2}$.

At the end of this period, the two groups of motors $M_1$ $M_3$ may be connected in series by placing $K_1$ $K_3$ on contacts 2 which lead to the middle point 12 of the transforming device.

(b) Second period of starting.

The contacts K are placed upon the points 3, so that $M_1$ is connected between 10 and 13, and $M_3$ between 11 and 14. The fluxes $\phi_1=\phi_3$ are decreased or the fluxes $\phi'_2=\phi''_2$ increased so that the motors will still be supplied with two E. M. F.'s $e_1+e'_2+e''_2=e'_2+e''_2+e_3$ which are always greater than their proper counter-E. M. F.

$A_1$ and $A_3$ now act as motors and $A'_2$ $A''_2$ as generators, the main line supplying power which is increased from $Vi$ to $2V$, and each of the groups $M_1$ $M_3$ absorbing a power increasing from $\frac{Vi}{2}$ to $Vi$.

At the end of this period, which completes the starting period, $M_1$ $M_3$ may be connected in parallel, each being directly connected to the main line between 10 and 14 by placing $K_1$ and $K_3$ on the contacts 4. From this moment, the motors $M_1$ $M_3$ operate according to their characteristics at the voltage V.

If the motors $M_1$ $M_3$ are suitably excited by an auxiliary exciter to enable them to operate as generators in a reliable manner, they would be capable (in addition to the braking effect which they might produce in parallel in accordance with their characteristics at constant voltage V) of producing a braking effect according to the two following periods.

(c) First braking period.

$K_1$ and $K_3$ are placed on contacts 3 thereby connecting $M_1$ between 10 and 13 and $M_3$ between 11 and 14. The fluxes $\phi_1=\phi_3$ are increased or the fluxes $\phi'_2=\phi''_2$ decreased so as to supply to the generators $M_1$ $M_3$ two counter-E. M. F.'s $e_1+e'_2+e''_2=e'_2+e''_2+e_3$ which are always somewhat below their proper E. M. F.

The action, as a whole, will be similar to that which takes place during the second period of starting, except that the period is performed in the reverse manner and that $i_0$ is greater by reason of the added losses in the auxiliary exciter.

(d) Second braking period.

$K_1$ and $K_3$ are placed on contacts 1, thereby connecting $M_1$ between 10 and 11, and $M_3$ between 13 and 14. The fluxes $\phi_1=\phi_3$ are decreased or the fluxes $O'_2=O''_2$ increased so as to supply to the generators $M_1$ $M_3$ two counter-E. M. F.'s $e_1=e_3$ which are always somewhat less than their proper E. M. F.

The action, as a whole, will be similar to that which takes place in the first period of starting, except for the differences which have been indicated above.

The current $i$ is regulated, during the starting, by regulating the excess of voltage supplied to the motors in relation to the E. M. F. which they produce at the given speed by means of the transforming device. During the braking, the regulation is carried out in a similar manner by adjusting the reduction of voltage supplied to the motors in relation to the same E. M. F. The device may be started and braked at constant current, or with current which is variable, as may be desired.

Each of the four machines $A_1$ $A'_2$ $A''_2$ $A_3$ will alternately absorb and supply a maximum power $\frac{1}{8}Vi$ and an average power $\frac{1}{12}Vi$; the group of four machines thus corresponds to a temporary maximum power $\frac{1}{2}Vi$ which is equal to one-fourth the power of the motors which are supplied with current; the average power of the group during the intermediate periods $16\frac{1}{3}Vi$ which equals one sixth of the power of the motors supplied with current. Moreover, all the machines have a voltage $\frac{1}{2}V$ instead of voltage V, which is an important advantage for small machines.

The left end of Fig. 1 shows four slides and four resistances in series with the four field windings, so that each field can be separately regulated. In the same figure, $a^1$ and $a^3$ are two ammeters. To the four contacts of the switches $K_1$ and $K_3$ shown in the figure may be added a fifth contact piece for short-circuiting $M_1$ and $M_3$, $M_1$ and $M_3$ being short-circuited at the end of the braking, if necessary. The operation of the switches $K_1$ $K_3$, and the switching devices which may be used, for modifying the method of feeding the motors when acting as generators and the operation of the slides in relation to the series of contacts of the flux-regulating devices, may be effected by a single controller or the like which is provided with hand or with distant servo-motor control; the servo-motor may be controlled by relays which act during the starting when the current taken by the motors falls below a given point, and during the braking when the current supplied by the motors falls below another given point.

An elaboration of the invention consists in providing an exciter for the groups of operation motors, so arranged that when starting and in normal running, it is acted on by a magnetizing current, that is the current taken by the motors while during braking and regeneration it is acted on by a demagnetizing current, that is the current supplied by the motors.

Figure 4 shows such an arrangement, wherein the exciter E is mounted on the same shaft with the armature parts.

As shown in Fig. 4, the armatures of the two groups of motors $M_1$ $M_3$ are directly connected to the points 10 and 14 of the regulating machine or group. These armatures are in series with the field windings 10′ 11′′′ and 14′ 13′′′ whose ends 11′′′ and 13′′′ should be respectively connected with the points 11 and 13 of the machine or group during the period $a$ (and with the points 13 and 11 during the period $b$). Each of these field windings is divided into two parts 10′ 11′ and 11″ 11′′′, or 14′ 13′ and 13″ 13′′′. The parts 10′ 11′ and 14′ 13′ are connected with the armature in a permanent manner and are acted upon by the magnetizing current during the starting and the normal working (the current taken by the motors), and by a demagnetizing current during the braking and the operation on recuperation (the current supplied by the motors). The parts 11′ 11′′′ and 13″ 13′′′ are connected during the starting and in normal operation with the parts 10 11′ and 14′ 13′ and receive the same magnetizing current as the latter. During the braking and the recuperation on the contrary, they are disconnected from the preceding and connected with a small exciter E supplied for the purpose and driven by the machine or by the group with constant flux which is here employed (operating partially as a motor of the known type excited in shunt and supplied at constant tension), the said exciter supplying to the same a magnetizing current.

Instead of using four general conductors whereof two proceed to the two groups of armatures and two are brought respectively from all the points 11′′′ and 13′′′, eight general conductors may be used whereof two proceed to the two groups of armatures and six are brought respectively from all the points 11′ 11″ 11′′′ 13′′′ 13″ 13′, in order to carry out all the required control operations. As regards apparatus, the following are required: two 2-way switches for respectively connecting the four-point switches $K_1$ $K_3$, either with the conductors brought from the terminals 11′′′ and 13′′′ during the periods $(a)$ and $(b)$ or with the conductors brought from the terminals 11′ and 13′ during the periods $(c)$ and $(d)$; two 2-way switches for respectively connecting the two conductors brought from the terminals 11″ and 13″, either with the conductors brought from the terminals 11′ and 13′ during the periods $(a)$ and $(b)$, or with the positive and negative terminals of the auxiliary exciter during the periods $(c)$ and $(d)$; and a simple switch for connecting the conductor brought from the terminals 11′′′ with the conductor brought from the terminals 13′′′ during the periods $(c)$ and $(d)$, and for braking this connection during the periods $(a)$ and $(b)$. These five apparatus may on the other hand be combined in a single device with two positions, one for the starting and the other for the braking.

In Figures 2 and 3 there is shown an arrangement of the transformer of Figure 1 which consists of two machines disposed together on the same axis, each having two main poles, and auxiliary or compensating poles if required; each machine having an armature with two distinct windings and two collectors, or commutators, each collector having two brushes.

The four windings which are always connected in such manner that the E. M. F.'s shall be added, should be situated in the following order: first winding of the first armature, then the two windings of the second armature, and finally the second winding of the first armature. Each of the four correcting poles may be supplied by the current passing in either of the two corresponding brushes $m$ or $n'$, $m'$ or $n$, $m''$ or $n'''$, $m'''$ or $n''$, or in like manner.

The two windings of the first armature comprised between the poles P and Q are submitted to a variable flux as follows: $O, \frac{1}{2}\phi, O, \frac{1}{2}\phi, O$ whilst the two windings of the second armature comprised between the poles $P_2$ and $Q_2$ are submitted to the variable flux as follows: $\frac{1}{2}\phi, O, \frac{1}{2}\phi, O, \frac{1}{2}\phi$. The total net flux of the group is equal to $\frac{1}{2}\phi$, a little more or less as for the machine described in connection with Fig. 12.

Fig. 1 shows a complete diagram of installation for all types of machines. Whatever may be the type adopted, this installation includes two ammeters $a_1$, $a_3$, two switches $k_1$ $k_3$ for four positions, the switches or contact devices which may be necessary to modify the exciter circuit of the motors when they are required to operate as generators for braking and for recuperation, the slides and sets of contact studs for the different devices used to regulate the flux, if required, or like devices.

The four positions of the switches $k_1$ $k_3$ correspond to the following connections: position (1) to the periods (a) and (d) (motors in imperfect series); position (2) to the operation of the motors in series without the use of the machine or the group; position 3 to the periods (b) and (c) (motors in imperfect shunt); position 4 to the operation of the motors in parallel without the use of the machine or the group.

The position (2) prevents current from passing in an unnecessary manner in the windings comprised between points 11 and 13. Position (4) prevents such passage of current in the windings comprised firstly between points 10 and 11 and secondly between points 13 and 14. These positions will thus serve to relieve the group by excluding the current-carrying circuits, aside from the variable periods (a) (b) (c) (d). As concerns the control of the contact switches $k_1$ $k_3$, the various switches which may be necessary for varying the excitation of the motors when these are required to act as generators, and the slides moving upon series of contact pieces used for regulating variable fluxes, or like devices,—this control may be carried out by means of a single controller, or a like device.

This latter may be operated by hand or at a distance by servomotor. The latter may in turn be controlled by relays adapted to move forward the controller during the starting when the current taken by the motors falls below a given point, and to move it forward during the braking, when the current supplied by the motors falls below another given point.

The machines and groups having a constant total flux and supplied at a constant tension will operate at a constant speed, and therefore they may be used in an accessory manner as motors for driving auxiliary machines, for instance exciters, in order to comply with additional requirements.

What I claim is:

1. A direct current regulating machine, comprising two similar armatures, mounted on the same shaft and each having two similar windings and two similar commutators, the four windings being connected in series through eight brushes in the following order; the first winding of the first armature, the two windings of the second armature and the second windings of the first armature, two fields windings the first of which being provided for the two windings of the first armature and the second for the two windings of the second armature, and means whereby to vary the flux of the first field winding and to vary the flux of the second field winding.

2. A direct current regulating machine, comprising two similar armatures, mounted on the same shaft and each having two similar windings and two similar commutators, the four windings being connected in series through eight brushes in the following order; the first winding of the first armature, the two windings of the second armature and the second winding of the first armature, two field windings the first of which being provided for the two windings of the first armature and the second for the two windings of the second armature, means being provided whereby to vary the flux of the first field winding and to vary by an equal quantity but in an opposite direction the flux of the second field winding.

3. A direct current transformer or pressure splitting device comprising two similar armatures, mounted on the same shaft and each having two similar windings and two commutators, the four windings being connected in series through eight brushes in the following order; the first winding of the first armature, the two windings of the second armature and the second winding of the first armature, so that the E. M. F.'s produced therein are added, a field magnet structure for each armature, separate field windings for each field magnet structure and means whereby the flux produced by the field windings may be varied.

4. A direct current pressure splitting device, comprising a set having two similar armatures having two extreme and at least two intermediate terminals, said armatures being mounted on the same shaft and each having two similar windings and two commutators, the four armature windings being connected in series through eight brushes in the following order: the first winding of the first armature, the two windings of the second armature and the second winding of the first armature, two field structures each provided with windings to produce fields for the respective armatures, means whereby to vary the flux of the first field and whereby to vary equally but in an opposite sense the flux of the second field so as to vary symmetrically the pressures at the intermediate terminals with respect to the pressures applied to the extreme terminals of the device and maintain a substantially constant speed of the device.

5. A direct current pressure splitting device comprising a set of four armature windings connected in series across a distributing line, the set having two extreme and at least two intermediate symmetrical terminals, the windings having the extreme terminals being similar and carried by a first armature core, and those having the intermediate terminals, carried by a second armature core, said cores being mounted on the same shaft, field windings for the cores and means whereby to vary the fluxes through the armature windings on the first armature core and whereby to vary as desired the flux through the armature windings of the second armature core, so as to vary symmetrically the pressures at the intermediate with respect to the pressures applied to the extreme terminal of the device.

6. A direct current transformer or pressure splitting device comprising four similar armature windings mounted on the same shaft and connected in series between the terminals of the line, two similar field windings, connected in series through a variable resistance across said line, for the two armature windings directly connected to said terminals and two similar field windings and a variable resistance connected in series across said line for the other two armature windings.

7. A direct current transformer or pressure splitting device comprising four similar armature windings mounted on the same shaft and connected in series between the terminals of the line, two similar field windings, connected in series through a variable resistance across said line, for the two armature windings directly connected to said terminals and two similar field windings and a variable resistance connected in series across said line for the other two armature windings, and means to vary the flux of the two first mentioned field windings and to vary equally, but in an opposite sense, the flux of the two second mentioned field windings.

8. A direct current transformer or pressure splitting device comprising; two similar end armature windings connected respectively to the two terminals of the line and each having a commutator fitted to half the line tension; at least one armature winding connected in series between said two end windings and having at least one commutator fitted to the full line tension; all these windings being wound upon armatures mounted on the same shaft; field windings to equally excite said two end windings and at least one field winding to excite said at least one intermediate winding, whereby the device splits the pressure of the line in at least three portions two of which are equal to each other.

9. A direct current transformer or pressure splitting device comprising; two similar end armature windings connected respectively to the two terminals of the line and each having a commutator fitted to half the line tension; at least one armature winding connected in series between said two end windings and having at least one commutator fitted to the full line tension; all these windings being wound upon armatures mounted on the same shaft; field windings with respective rheostats to equally excite said two end windings and at least one field winding with respective rheostat to excite said at least one intermediate winding, whereby the device splits the pressure of the line in at least three portions two of which at the two ends of the series are equal to each other.

10. A symmetrical pressure splitting device comprising; two armature windings directly connected to the two terminals of the line and a group of armature windings connected in series between said two armature windings; all the armature windings being mounted on the same shaft; the two armature windings directly connected to the line each having a commutator fitted to half the line tension; the group of interconnected armature windings having commutators fitted together to the full line tension; field structures for the two armature windings directly connected to the line; field structures for the group of interconnected armature windings; means to vary on one side the magnetic fluxes through the two armature windings directly connected to the line so that these two fluxes are always equal to each other; and means to vary the magnetic fluxes through the group of interconnected armature windings so that the sum of these fluxes vary in contrary sense to that of the sum of the fluxes through the two armature windings directly connected to the line.

In testimony whereof I affix my signature.

ANGELO DELLA RICCIA.